US006749916B1

(12) United States Patent

Matthews et al.

(10) Patent No.: US 6,749,916 B1

(45) Date of Patent: Jun. 15, 2004

(54) MULTIPLE LAYER LABELS FOR APPLICATION TO NON-PLANAR SURFACES AND APPARATUS AND METHODS FOR PRODUCTION

(75) Inventors: Lowell F. Matthews, Los Alimitos, CA (US); Thomas P. Miller, Garden Grove, CA (US); Kyle J. Putzier, Anaheim, CA (US)

(73) Assignee: Ampersand Label, Garden Grove, CA (US)

( * ) Notice: Subject to any disclaimer, the term of this patent is extended or adjusted under 35 U.S.C. 154(b) by 0 days.

(21) Appl. No.: 09/523,242

(22) Filed: Mar. 10, 2000

(51) Int. Cl.[7] .............................. G09F 3/02; B32B 7/06; B42D 15/00

(52) U.S. Cl. .......................... 428/40.1; 428/343; 281/2; 281/5; 283/81; 283/101

(58) Field of Search ............................ 428/40.1, 40.11, 428/192, 343; 283/81, 101; 281/2, 5

(56) References Cited

U.S. PATENT DOCUMENTS

| | | | | | |
|---|---|---|---|---|---|
| 1,974,401 | A | | 9/1934 | Miller | |
| 4,534,582 | A | | 8/1985 | Howard | |
| 4,534,813 | A | | 8/1985 | Williamson et al. | |
| 4,592,572 | A | | 6/1986 | Instance | |
| 4,621,442 | A | | 11/1986 | Mack | |
| 4,690,720 | A | | 9/1987 | Mack | |
| 4,711,686 | A | | 12/1987 | Instance | |
| 4,744,161 | A | | 5/1988 | Instance | |
| 4,744,591 | A | | 5/1988 | Instance | |
| 4,868,027 | A | | 9/1989 | Hunkeler et al. | |
| 5,096,767 | A | * | 3/1992 | Harada et al. | 428/204 |
| 5,174,605 | A | * | 12/1992 | Instance | 281/5 |
| 5,200,243 | A | | 4/1993 | Van Veen | |
| 5,207,458 | A | | 5/1993 | Treichel et al. | |
| 5,234,735 | A | * | 8/1993 | Baker et al. | 428/40 |
| 5,399,403 | A | * | 3/1995 | Instance | 428/40 |
| 5,403,636 | A | | 4/1995 | Crum | |
| 5,439,721 | A | | 8/1995 | Pedroli et al. | |
| 5,458,374 | A | | 10/1995 | Vijuk et al. | |
| 5,588,239 | A | | 12/1996 | Anderson | |
| 5,700,537 | A | | 12/1997 | Instance | |
| 5,727,819 | A | * | 3/1998 | Grosskopf et al. | 283/81 |
| 5,804,271 | A | * | 9/1998 | Barry | 428/40.1 |
| 5,860,238 | A | | 1/1999 | Anderson | |
| 5,975,582 | A | * | 11/1999 | Treleaven | 283/81 |
| 6,027,598 | A | | 2/2000 | Anderson | |
| 2001/0011821 | A1 | * | 8/2001 | Lind | 283/81 |
| 2002/0041945 | A1 | * | 4/2002 | Scholz et al. | 428/41.8 |

* cited by examiner

*Primary Examiner*—Harold Pyon
*Assistant Examiner*—Brian P Egan
(74) *Attorney, Agent, or Firm*—Wood, Herron & Evans LLP

(57) ABSTRACT

A multiple layer label has a pre-curved upper label on a base label. When applied to a curved or non-planar surface, a gap between portion of the labels accommodates the wrapping of the label structure around the surface and avoids tearing, splitting, bunching and wrinkling in the respective upper and base labels. The label structure is formed by bending the labels around a forming surface, releasing one end of the upper label and repositioning it on the base label so that when removed from the bending operation and straightened out, the upper label is arched away from the base label. Apparatus and methods are disclosed.

58 Claims, 5 Drawing Sheets

MULTIPLE LAYER LABELS FOR APPLICATION TO NON-PLANAR SURFACES AND APPARATUS AND METHODS FOR PRODUCTION

This invention relates to labels and more particularly to multiple layer labels for application to curved or non-planar surfaces, and methods for making such labels.

The application of single layer labels to curved or non-planar surfaces is an old expedient. More recently, the use of multiple layer labels has been desired. When multiple layer labels are manufactured in-line or in cut sheet processes in generally flat format, their subsequent application to a curved or non-planar surface presents problems. When two adjacent flat labels are applied around a curved or non-planar surface, the outer layer is formed about one outer radius and the inner layer about a shorter inner radius. The differences in these radius dimensions can cause stress and other phenomena within the label structure which act to produce undesirable results in the label.

For example, the outer layer can be unduly stretched to disadvantage such as cracking, tearing, graphic malformation and the like. The inner label can be compressed or bunched, causing it to wrinkle, deform or produce otherwise undesirable aesthetic or physical configurations. Adhesion to the target can be adversely affected. Accordingly, it has been one objective of the invention to provide an improved multiple layer label for application to curved or non-planar surfaces.

Another objective of the invention has been to provide an improved multiple layer label supply with labels particularly useful for application to curved or non-planar surfaces.

Another objective of the invention has been to provide a method for the manufacture of multiple layer labels which facilitates this application to curved or non-planar surfaces.

A further objective of the invention has been to provide apparatus for making multiple layer labels configured for application to curved or non-planar surfaces.

To these ends, a multiple layer label according to one embodiment of the invention comprises a base label, an upper label and an overlaminate disposed over the upper label and holding it onto the base label wherein the overlaminate and upper label are attached at their ends to the base label, but in a central portion are arched away from or spaced outwardly from the base label. When the base label is wrapped or placed onto a curved or non-planar surface, both the base label and the upper label and overlaminate wrap around the surface with the arched portion accommodating the wrapping movement so no undue stresses are placed on the upper label and so the base label is not wrinkled. The preferred embodiment of the label structure thus includes an upper label and overlaminate which is pre-curved to facilitate application of the entire label structure to a curved or non-planar surface.

Other alternative embodiments are contemplated. For example, it may be desirable to provide an arched or pre-curved upper label, without any additional layer, such as an overlaminate, on a base label. Also, it is contemplated that the upper label may include multiple upper labels, all of which are pre-curved or arched on a base label.

Preferably, a trailing edge tab is provided on the upper label layer for release of at least one end of the upper label from the base label when in use and subsequent resealing thereon.

In preferred methods and apparatus of producing a pre-curved label structure according to the invention, an in-line press is modified to incorporate a pre-curve station.

Alternately, the invention contemplates use with other forms of web presses. For example, upper labels are held on a base label layer web by an overlaminate extending beyond both leading and trailing edges of the upper label. A lift-up tab is attached to the trailing edge of the upper label layer by an intermediate portion of overlaminate, which also adheres the upper label to the base label layer.

The labels are then reversed in direction and drawn about a forming roller surface having a radius preferably about the same effective radius as the non-planar target surface. This causes the trailing edge of the upper label (overlaminate) to lift off the base label web). Other rollers with radiuses different from the target surface may be utilized to effect the invention. This wrapping around the forming roller surfaces thus breaks the adhesion of the intermediate overlaminate to a release coat area of the base label layer and it lifts and translates forwardly, the upper label and overlaminate lying outwardly of and in contact with the base label. A nip roller opposing the forming roller reattaches the detached portion base to the base label layer.

When the web direction is again reversed and the base label layer flattened out, the upper label layer and laminate curve or arch outwardly on the base label layer. Thereafter, the base labels are die cut on the base liner and the pre-curved upper labels on the base labels are stored or are applied to a curved or non-planar surface.

In this regard, the label structures of the invention, except for the pre-curve structure and method, are like those described in U.S. patent application Ser. No. 09/266,638 filed Mar. 11, 1999 entitled MULTIPLE LAYER LABELS AND METHODS and expressly incorporated herein by reference as if fully and expressly set forth herein. The pre-curve station described herein is added to the apparatus of that patent in-line and at a point just prior to the die cutting of the base labels from the base label layer or web, and removal of the waste matrix.

The structure of the pre-curved label described herein is highly useful in providing an aesthetic, multiple layer label for use on curved or non-planar surfaces and without the stress, cracking, splitting or bunching of typical multiple layer labels when applied to such surfaces.

Moreover, the method and apparatus for producing such pre-curved labels is simple, inexpensive and useful in-line so that the entire label supply can be formed all in-line without intermittent operation or other stoppages. The pre-curve arch in the upper label is formed in them continuously and without treating the structures in any off-line equipment.

These and other objectives and advantages will become readily apparent from the following detailed description of preferred embodiments of the invention and from the drawings in which.

Figure 1A:
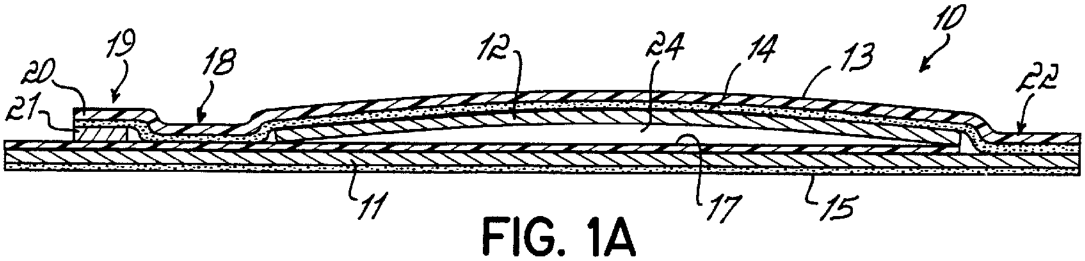
FIG. 1A is an illustrative cross-sectional view showing how a pre-curved multiple layer label is configured according to the invention prior to application to a curved or non-planar surface, such as a cylindrical bottle.
Figure 1B:
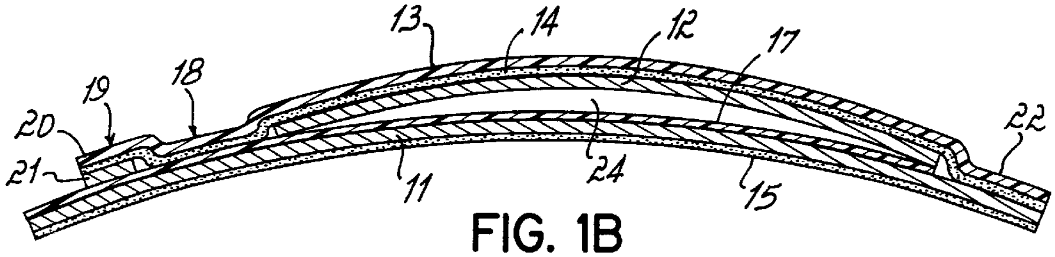
FIG. 1B is a view similar to FIG. 1A showing the bending of the label as wrapped onto a target.
Figure 1C:
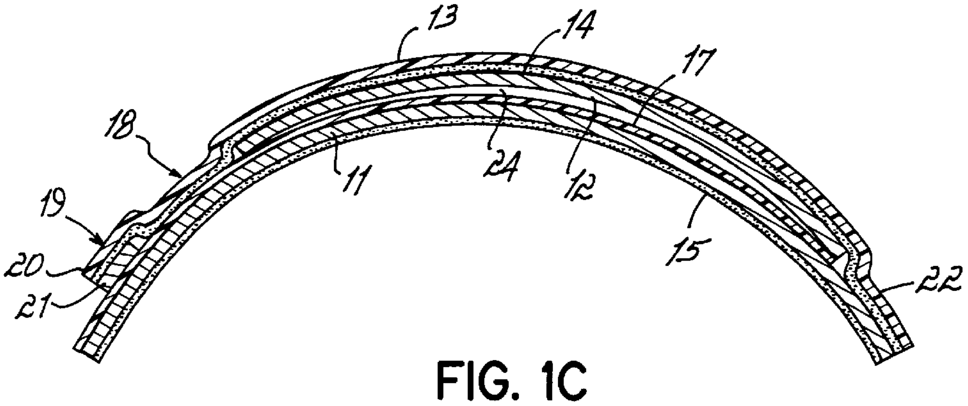
FIG. 1C is a view similar to FIG. 1B showing the progression of wrapping a label around a target.
Figure 1D:
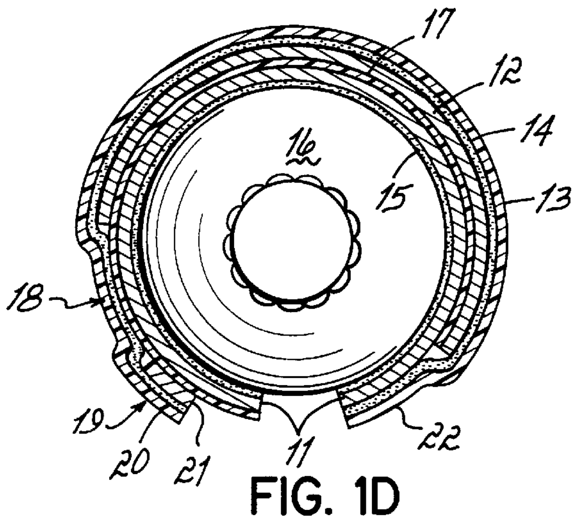
FIG. 1D is a top view showing a label of FIG. 1 on a cylindrical target.

Turning now to the drawings, a multiple layer label 10 according to the invention is shown in FIGS. 1A–1D and FIGS. 5–8. It will be appreciated that these figures are exaggerated for illustrative purposes with respect to the size of the components shown in the figures and the spacing of the components. For example, the relative thickness of the webs and other layers of the label 10, as well as the relationship of those thicknesses to a labeled item, such as shown in FIG. 1D, are exaggerated for illustration.

Turning now to FIG. 1A, a multiple layer label 10 comprises in a preferred embodiment, a base label 11, an upper label 12 and an overlaminate 13. Also shown in FIG. 1A are an adhesive layer 14 on the overlaminate 13 and an adhesive layer 15 beneath the base label 11. The adhesive layer 14 secures the overlaminate both to the upper label and to parts of the base label structure, as will be described, while the adhesive 15 is for the purpose of securing the label structure 10 to an item, such as a cylindrical container 16 illustrated in FIG. 1D.

Returning to FIG. 1A, a release coat 17 is provided on the base label 11, underlying, as shown in FIG. 1A, both the upper label 12 and an intermediate portion 18 of the overlaminate 13. A tab 19 comprising a portion 20 of the overlaminate 13 and a reinforcing layer 21 (formed from web 12W, laber described) is considered to be a part of the overall upper label structure, with the tab 19 being secured to the upper label 12 by way of the intermediate portion 18 of the overlaminate 13. The adhesive layer 14 serves to secure the overlaminate portion 20 to the reinforcing layer 21.

It will also be appreciated from FIG. 1A that the release coat 17 preferably does not extend under the portion 22 of the overlaminate 13 so that the overlaminate, at its portion 22, at one end of the upper label 12, is more permanently secured to the base label 11 than is the intermediate portion 18, which does reside on the release coat 17. The overlaminate 13 thus can serve at 22 as a hinge of upper label 12 on base label 1).

It will also be appreciated that the upper label 12 is spaced from the base label 11 by a gap 24 when the base label 11 is positioned in a generally planar or flat configuration, such as it may appear after the label structure has been formed.

For descriptive purposes, it will be appreciated then that the multiple layer label 10 includes generally a pre-curved upper label structure which is comprised of, in part, the upper label 12 and in part the overlaminate 13. The base label, on the other hand, may be described as a base label structure which includes the base label 11, together with a release coat 17 and the adhesive layer 15.

It will also be appreciated that the tab 19 extends from one end (preferably the trailing end) of the upper label structure.

Figure 8:
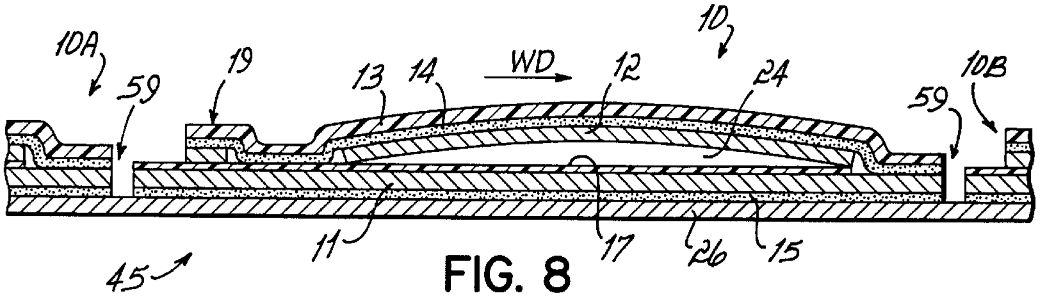
FIG. 8 is a cross sectional view similar to FIG. 7 but after the base labels have been die cut and the waste matrix removed to define the finished label supply.

Turning now to FIG. 8, there is shown a multiple layer label 10 similar to that shown in FIG. 1A, the difference being the addition in FIG. 8 of a liner backer or carrier web 26 under the adhesive 15 of a number of labels (10, 10A, 10B). FIG. 8 thus illustrates the multiple layer labels 10 as carried on a web, such as web 26, to form a label supply. Thus, referring to FIG. 8, the multiple layer label 10, for example, is carried on web 26 between other similar multiple layer labels such as at 10A and 10B for example.

Figure 2:
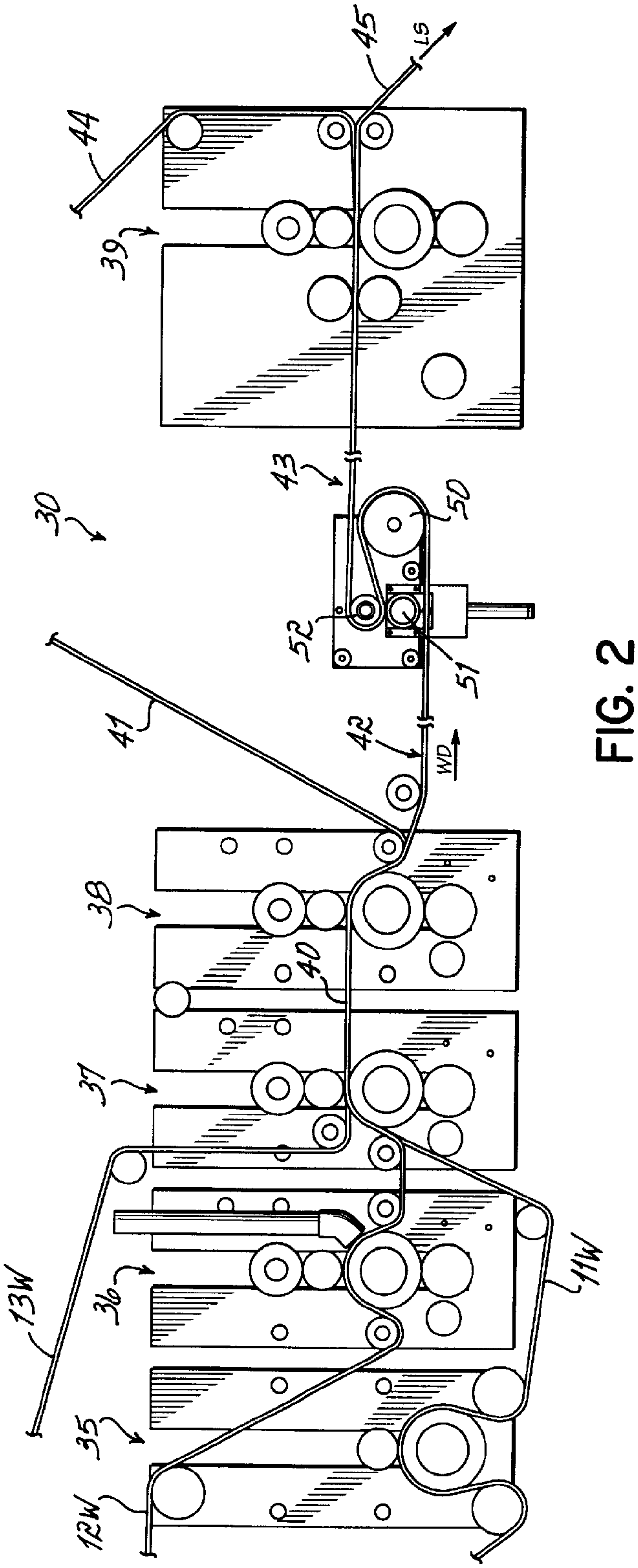
FIG. 2 is an illustrative elevational view of apparatus for making the label of FIG. 1, including a pre-curve apparatus.
Figure 5:
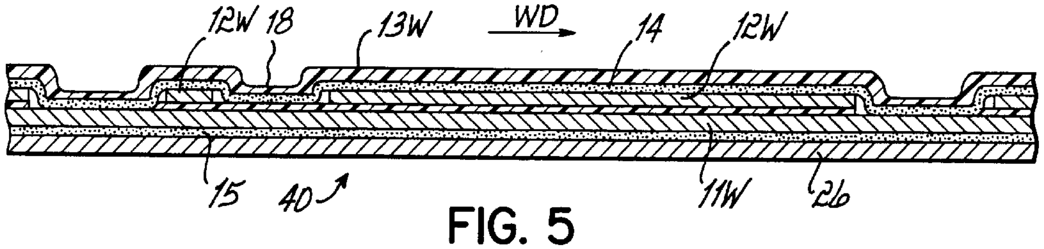
FIG. 5 is a cross-sectional view of a composite label web for making the label of FIG. 1 and showing its construction before the overlaminate is die cut.
Figure 6:
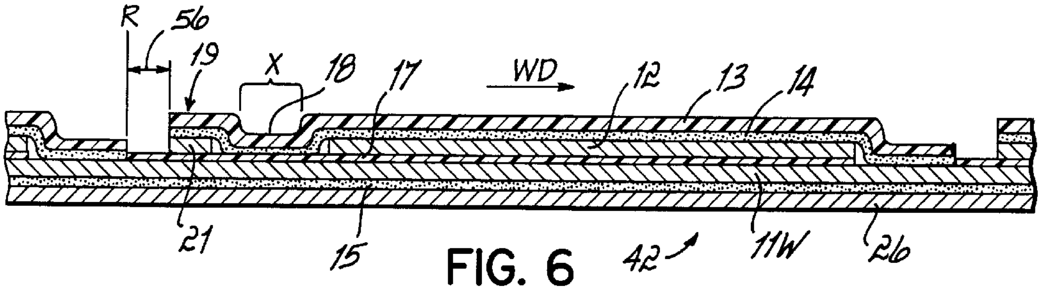
FIG. 6 is a cross sectional view similar to FIG. 5 showing the die cut overlaminate.

It will be appreciated that the multiple layer labels 10 as they appear in FIGS. 5 and 6 are preferably formed by the process described and illustrated in co-pending U.S. patent application Ser. No. 09/266,638, filed Mar. 11, 1999, and entitled MULTIPLE LAYER LABELS AND METHODS and which is expressly incorporated herein by reference, as if fully set forth herein. Such an apparatus and process is illustrated diagrammatically at FIG. 2, the difference being the insertion of a label forming or bending apparatus 30 between operative stations or steps in an in-line process for manufacturing a label supply LS in rolled format, for example, as illustrated in FIG. 2. Downstream of the apparatus 30, the labels 10 are modified and appear as shown in FIG. 1A and the label supply illustrated in FIGS. 7 and 8.

It will be appreciated that the forming or bending station 30 according to the invention herein, can be inserted in-line, in such a process so as to form a label supply LS continuously and in-line on the same apparatus. Alternately, the forming or bending station 30 could be used downstream on the web before final rolling into a label supply or at some other position in an in-line process.

Referring to FIG. 2 and very briefly making reference to the overall label forming process, a label press such as a "PRIME FLEX" label press made by RotoPress is utilized. This press includes a plurality of press stations, such as stations 35–39 illustrated in FIG. 2

At station 37, an upper layer label web 12W is combined with a base label layer web 11W by means of an overlaminate web 13W to form a composite web 40. From web 40, a waste matrix 41 of overlaminate material, for example, has been removed downstream of station 38 to produce a composite web, such as web 42, as more particularly illustrated in detail in FIG. 6.

Figure 7:
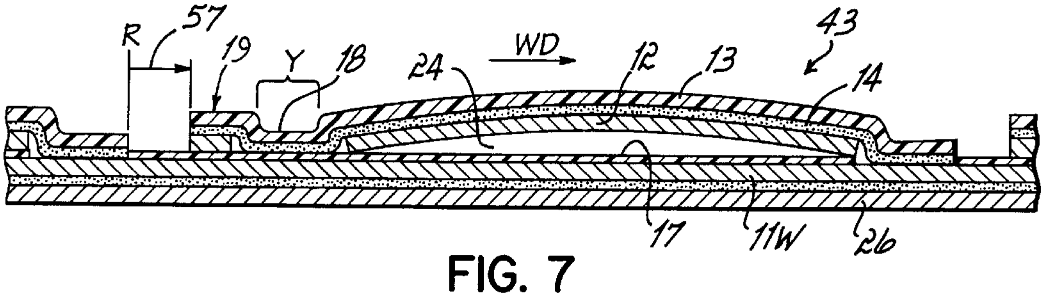
FIG. 7 is a cross sectional view similar to FIG. 6 after the upper label has been pre-curved according to the invention.

Subsequent to passing through the bending and forming station 30, the web 42 is reconfigured as best illustrated in FIG. 7 where the web is identified as reconfigured web 43. Thereafter, the base labels are die cut at station 39 and a waste base label layer matrix 44 is removed therefrom in one direction, while the final label supply web 45, such as illustrated in FIG. 8, is produced at LS for storage for rolling or for application.

As more particularly described in the co-pending application cited above, the three webs 11W, 12W and 13W are combined in a process such as in station 37 by the use of precut holes extending through the web 12W so that the sticky overlaminate can extend through the holes and secure the web 12W onto the base web 11W for further processing.

While the multiple layer label 10 might be made up in another fashion or by other processes or means, the particular manufacture according to the aforesaid co-pending application, is particularly useful. The overlaminate 13W is thus applied over the upper label layer web 12W and secures it to the base label web 11W for further processing, such as at the bending and forming station 30 disclosed herein, and for the final die cutting of the base labels on the carrier web or liner 26 to form the label supply LS.

According to the process in that application, since the web 12W is precut with holes in it, the final cutting of the upper label layer from the web 12W and the overlaminate 13W at station 38, for example, produces the composite web 42 as shown in FIG. 6 from web 40 (FIG. 5).

Figure 3:
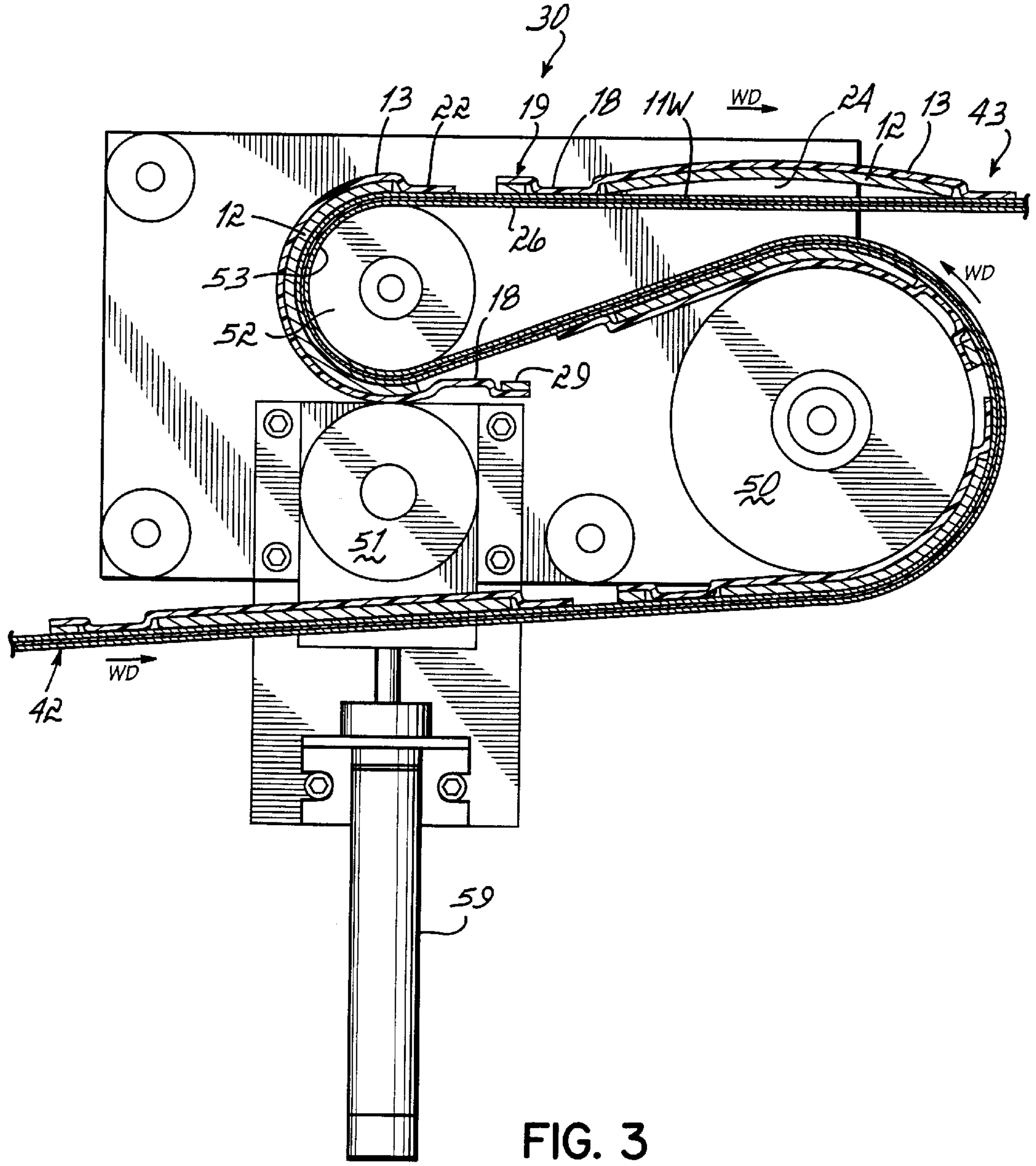
FIG. 3 is an illustrative elevational view of the pre-curve apparatus shown in FIG. 2.
Figure 4:
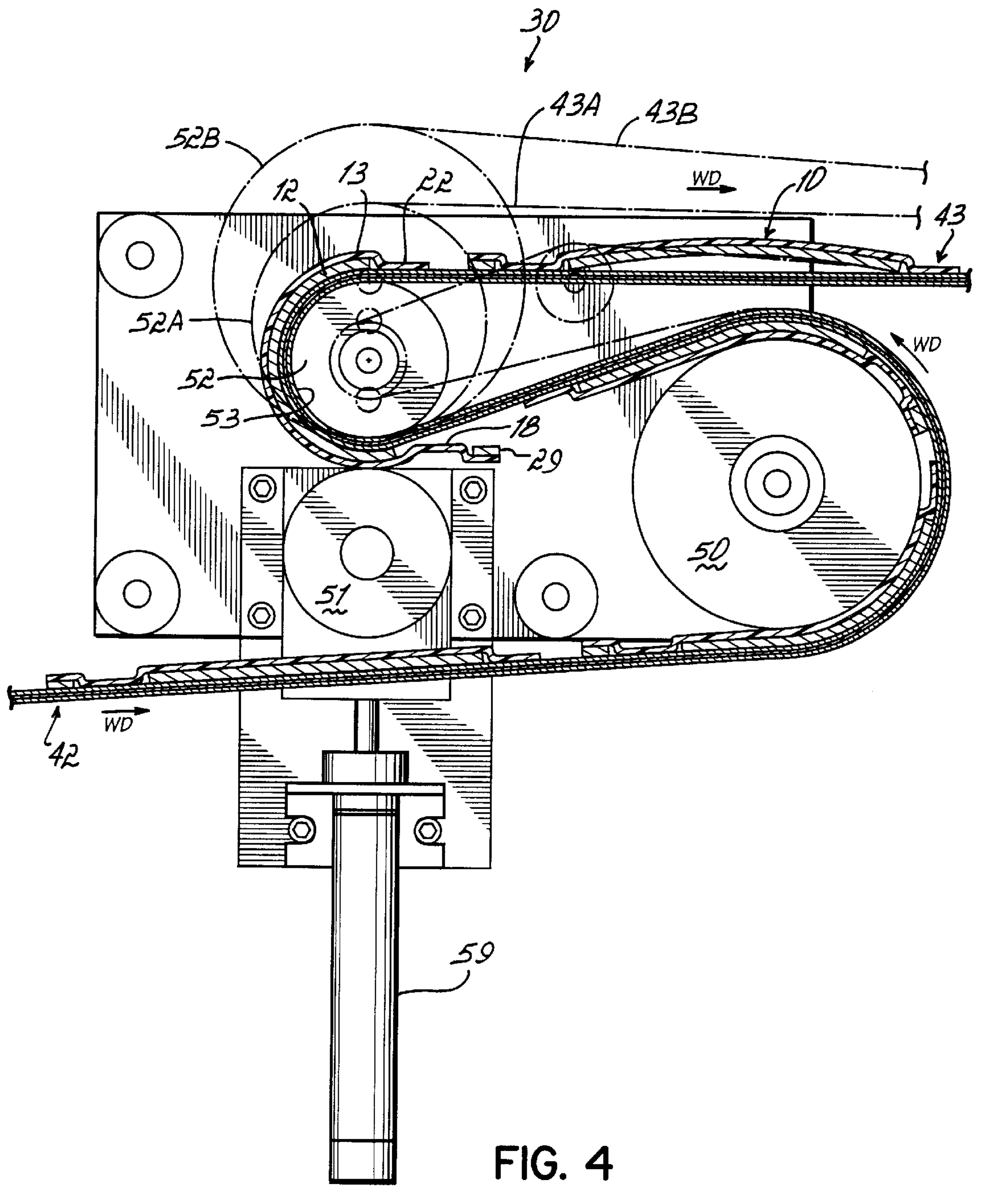
FIG. 4 is an illustrative view of the pre-curve apparatus of FIGS. 2 and 3 showing use of different pre-curve rollers for differing non-planar surfaces.

The formation of the pre-curved upper label layer 12 is carried out at the bending and forming station 30 according to this invention and as more particularly illustrated in FIGS. 3 and 4.

Turning now to FIG. 3, the details of the forming and bending station to produce the arched or pre-curved multiple layer labels 10 is illustrated. It will be appreciated that the web, as it exists at 42, is fed into the station 30 and the modified web 42 is discharged from the station 30 as modified web 43. When the web 42 is fed into the station 30, all the label layers are relatively flat and adjacent each other. On the other hand, after passing through the station, the label structure has been modified and pre-curved so that the upper label 12 has been arched or curved away from the base label web 11W.

The forming and bending station 30 includes a web direction reversing roller 50, a nip roller 51 and a forming roller 52. It will also be appreciated in both FIGS. 3 and 4 that an air cylinder, such as at 59, is utilized to urge the nip roller 51 toward the forming roller 52 so as to provide the compression, the roller 51 being located opposite the roller 52 to nip the label web therebetween. The forming roller 52 has a forming or bending surface 53 thereon, which engages the underside of the liner or carrier web 26, such that the label structure, including the upper labels 12 and the base label web 11W are positioned outwardly thereof. It will be appreciated in this regard that the base label layer or web 11W is positioned between the surface 53 of forming roller 52 and the upper label layer 12.

As the composite web is drawn around the forming roller 52, it will be appreciated that the liner web 26 is drawn about a tighter or lesser radius than is the upper label layer 12. The forward end of the overlaminate at its portion 22 is pulled along by the web, however, as the bend around the roller 52 progresses, the upper label 12 and the overlaminate 13, and particularly the intermediate portion 18 thereof, is delaminated from the base label layer 11W and particularly from the release coat 17 thereon, so that, for example, it is spaced apart therefrom, as illustrated in FIG. 3.

As the web progresses in the web direction WD, shown by the arrows in the various figures, the detached portion 18 of the overlaminate 13 is pulled between the forming roller 52 and the nip roller 51 where the portion 18 is reattached to the base label layer 11W and any release coat thereon, as shown just downstream of the roller 52 for the preceding label structure.

It will be appreciated that the web 42, and as modified at 43, is continuously moved through the station 30. This continuous motion detaches the trailing end of the upper labels 12 and overlaminate 13 and then reattaches it, thereby moving the portions 18 of the overlaminate to a different or slightly different area on the base web 11W.

This reposition and resealing of the portion 18 of the overlaminate 13 is perhaps best illustrated in comparing FIGS. 6 and 7. In FIGS. 6 and 7, a datum or reference line R is provided at the end of the next following overlaminate. FIG. 6 illustrates the condition of the components on the web 42 immediately before passing through the forming and bending station 30. The distance from the trailing end of the tab 19 to the reference line R is illustrated by the distance arrow 56.

On the other hand, the components shown in FIG. 7 are in the position they assume in the modified web at 43 after passing around the forming roller 52. There, the distance between the trailing end of the tab 19 and the same reference line R, which has not moved in the web structure, is a greater distance 57.

Accordingly, it will be appreciated that prior to station 30, the intermediate overlaminate portion 18 extends over and is attached to the release coat 17 through an area X as illustrated in FIG. 6. While that intermediate portion 18 of the overlaminate 13 traverses the same distance after it is passed around the forming roller 52, it will be appreciated that it now has been repositioned and overlies a different area illustrated at Y in FIG. 7. Area Y has been moved to the right, or forwardly on web 11W, with respect to the web direction WD as illustrated by the distance arrow 57 in FIG. 7, which is longer than distance 56.

This movement or repositioning of the intermediate portion 18 of the overlaminate and the tab 19 to the right or forwardly as viewed in the figures creates, after the composite web has been wrapped around the forming roller 52 and then flattened out, a gap 24 between the upper label 12 and the base label layer 11W.

The initial attachment area X defined by the engagement of the intermediate portion 18 with a release coat 17 and base label layer 11W in FIG. 6, may overlap the reattached area illustrated by Y in FIG. 7, or it may be completely forwardly thereof, depending on the parameters used in the particular label application and target curvature as desired.

Preferably, it will be appreciated that there is a difference in the distances 57 and 56 of about 0.020 inches to about 0.030 inches when the labels in the roller 52 are configured for wrapping around cylindrical containers in the neighborhood of one inch or so in diameter, up to five or six inches or so in diameter. This is by way of example only and it will be appreciated that the amount of movement or reposition distance of the intermediate portion 18 and tab 19 with respect to the base label layer 11W and the size of the gap 24 will vary according to the operative radius of the forming roller 52.

Forming roller 52 has a radius which may be larger or smaller than is shown in FIG. 3. The opportunity to utilize varied size forming rollers a forming surfaces such as 52, 52A or 52B is illustrated in FIG. 4, with the remaining components of the apparatus of station 30 being essentially the same. The radius of the forming roller 52 is a generally related function of the intended target which the multiple layer labels 10 will be applied.

For example, it is preferable that the radius of the forming roller 52 generally approximates the similar radius presented by the intended target or item onto which the labels 10 will be applied. A direct correlation, however, is not believed necessary to obtain the advantages of the invention. There are many parameters involved, such as the thickness of the various labels of the composite multiple layer label 10, the nature of the materials themselves, curvature or shape of the target and so on.

Where a larger radius forming roller 52A is utilized, the modified label supply web is indicated at 43A. Where a yet larger radius forming roller 52B is utilized, a modified web is indicated at 43B. In each of these cases, the multiple layer pre-curved label 10 takes on the same or similar configuration as shown at 10 in FIG. 4.

It will also be appreciated that the bending and forming station 30 is located on an in-line continuously operating web press preferably in the general position as shown in FIG. 2 and as described above. The station 30 could be independently mounted or utilized in another suitable position in the forming process.

From the bending and forming station 30, the web 43 is transported to the treatment station 39 wherein the base label layer is die cut to define individual base labels 11 thereon. The waste matrix of the base label layer 11W illustrated at 44 is removed therefrom and the finally finished web supply illustrated at 45 and at the arrow LS is wound up.

Further looking at FIG. 8, it will be appreciated that the final cuts 59 are formed in the base label web 11W at station 39 (FIG. 2) to separate individual labels 10, one from the other, on liner 26.

As noted above and in an alternative embodiment, the bending and forming station 30 might be utilized downstream of the removal of the waste matrix 44, for example, still producing curved upper labels 12 on base labels 11.

Also referring to FIGS. 3 and 4, it will be appreciated that the forming roller 52 is described as having a forming surface 53 thereon. According to the invention, it is only necessary to bend the composite structure so that the upper label 12, together with the overlaminate, is detached at its trailing end and then reattached to the base label web. Any suitable forming surface might be utilized, with the surface 53 actually moving as a roller surface or the surface 53 might be a stationary surface on a stationary roller or other stationary element which does not roll at all, with the web simply slipping therearound, still functioning to cause the upper label 12 and the overlaminate 13 to break away, reposition and then be reattached. Accordingly, the invention contemplates the use of a forming or bending surface to detach and reposition at least an end of the upper label structure 12, 13 to form the pre-curved in the upper label 12 as illustrated in FIG. 3, whether or not the roller 52 or some other suitable forming surface is utilized.

FIGS. 1A through 1D illustrate the progression of the application of a multiple layer label 10 onto a curved surface, such as a cylindrical container 16. FIG. 1A illustrates the label 10 in a flattened format, with the upper label 12 being curved away from the lower or base label 11 and with a gap 24 therebetween.

FIG. 1B illustrates the preliminary wrapping of the label 10 into an intermediate position for wrapping around the container 16 of FIG. 1D.

FIG. 1C illustrates a further wrap where the gap 24 is substantially reduced to illustrate that progression of the closing of the gap as the label is wrapped around the container 16 (FIG. 10).

As the label 10 is finally wrapped around the container 16, the gap 24 decreases in size so that finally, as illustrated in FIG. 1D, the components of the multiple layer label are all adjacent each other.

At this point in time, it should be appreciated that the wrapping process may involve the attachment of the forward edge of the label 10 that is opposite the tab end 19 (see portion 22 of overlaminate 13) being first attached to the container, and thereafter wrapped around the container with the label 10 at its trailing edge proximate the tab 19 being the last portion of the label structure to be adhered to the container 16.

Alternately, the label 10 could be applied to the target tab end first. The label can thus open, in use, either to the left or to the right.

It will also be appreciated that the overlaminate at area 22 is secured by the adhesive 14, preferably directly to the base label 11. On the other hand, the intermediate area 18 of the overlaminate 13 is disposed over the release layer 17 on the base label 11 so that its degree of adherence to the base label 11 is less than that at the portion 22.

The reinforcing layer 21 of the tab 19 is preferably not secured at all to the release coat 17. It is easy for a user to lift up the tab 19 and to pull away the area 18 of the overlaminate from the base label 11 and thereafter lift the entire overlaminate and upper label structure 12, 13 away from the base layer 11 to expose the underside of the upper label 12 and the outer side or surface of the base label 11.

These surfaces, if desired, could be printed, such printing have taken place such as at the stations in the press of FIG. 2, as will be appreciated.

Thus, it should be appreciated that the pre-curved label 10, such as shown in FIG. 1A, is preferably supplied in a label supply such as shown in FIG. 8 for removal from the web 26 and application to a container such as container 16.

It should also be appreciated throughout that the pre-curved labels 10 are particularly adapted to application to curved or non-planar surfaces, such as those found on a container 16. These surfaces are generally cylindrical as illustrated, for example, or can be made of a plurality of flat surfaces extending around a rectangular or square or octagonal container, for example.

In any event, the label produced by the methods herein and as disclosed herein, is particularly useful for application to curved or non-planar surfaces which are curved in one dimension, such as to cylindrical or faceted convex surfaces, as opposed to more complex convex surfaces having curves in several dimensions, such as, for example, a spherically-shaped item.

It will also be appreciated that the materials of the composite label 10 can be of any suitable nature. For example, the overlaminate can be transparent, translucent or opaque and can be paper, plastic or other suitable material. This also applies to the upper label web 12W and the base label web 11W. Any suitable easy-to-release coats can be used and these are well known in the industry.

Finally, it should be appreciated that when as wrapped on container 16 (FIG. 1D), it is not necessary that the label structure 10 not overlap itself. The label could be overlapped when wrapped around a very small target.

Accordingly, the inventions provides methods and apparatus for forming pre-curve labels with particular utility and application curved or non-planar surfaces. When the pre-curved label is wrapped around such a surface, the expected stresses and difficulties are accommodated by the pre-curved nature as described, including the gap between the upper and lower label, so that the upper label is not stretched, cracked or split and the lower label is not bunched or wrinkled.

Moreover, the process of forming the pre-curved labels as described can be carried out continuously and in-line on the same press in which the label supply is formed, with only a slight modification to the press to add the bending and forming station 30 as described.

These and other benefits and advantages will become readily apparent to those of ordinary skill in the art without departing from the scope of the invention, and applicant intends to be bound only by the claims appended hereto.

What is claimed is:

1. A multiple layer label for application on a curved or non-planar surface, said label comprising:

a base label having a periphery therearound;

an upper label;

an overlaminate extending beyond and overlapping said upper label and holding said upper label on said base label;

said overlaminate being attached to said base label in areas of attachment where said overlaminate extends beyond said upper label and said overlaminate extending beyond said upper label being confined within said periphery of said base label;

said upper label having a lowermost surface adjacent said base label with a respective portion thereof between said areas of attachment spaced away from said base label prior to application of said multiple layer label to a surface and defining a gap between said portion and said base label, said spaced away portion of said upper label in contact with said base label being in contact throughout the length of said spaced away portion when said multiple layer label is applied to said surface.

2. A label as in claim 1 wherein said base label is provided with an adhesive for application to said non-planar surface.

3. A label as in claim 1 further including a tab and an intermediate portion of overlaminate connecting said tab to said upper label.

4. A label as in claim 1 wherein said overlaminate includes an intermediate portion extending beyond said upper label and containing adhesive for releasably sticking to said base label and further including a reinforcing tab layer under a distal end of said intermediate portion to facilitate lifting of said upper label from said base label.

5. A label as in claim 1 including a release coat on said base label on an area thereof underlying said overlaminate at one end thereof.

6. A multiple layer label as in claim 1 wherein said upper label comprises a plurality of label layers with said lower surface portion defined on the label layer closest to said base label.

7. A label as in claim 1 wherein said upper label has a trailing edge and a portion of said overlaminate extending beyond said upper label comprises an intermediate overlaminate portion extending from said trailing edge.

8. A label as in claim 7 including a release coat on said base label and disposed in an area underlying said intermediate overlaminate portion.

9. A label as in claim 1 wherein said base label is carried on a liner web and said base label separating said upper label and said overlaminate from all contact with said liner.

10. A label as in claim 9 wherein a plurality of base labels and arched upper labels thereon comprise a label supply.

11. A multiple layer label for application on a curved or non-planar surface, said label comprising:

a base label;

an upper label;

means for holding said upper label in position over said base label;

said upper label having a lower surface portion spaced away from said base label prior to application of said multiple layer label to a target;

said means for holding being secured to and confined to adhesive contact only with upper label and said base label, said spaced away lower surface portion and said base label defining a space therebetween free of intervening label components so said lower surface portion is free to move toward said base label throughout the length of said lower surface portion when said multiple layer label is applied to said surface.

12. A label as in claim 11 wherein said base label is provided with an adhesive for application to said non-planar surface.

13. A label as in claim 11 wherein said upper label is spaced away from said base label, such that said upper label and said base label contact each other substantially throughout their length when applied to a non-planar surface.

14. A label as in claim 11 including a release coat on said base label on an area thereof underlying said one end of said upper label.

15. A multiple layer label as in claim 11 wherein said upper label comprises a plurality of label layers with said lower surface portion defined on the label layer closest to said base label.

16. A multiple layer label for application on a curved or non-planar surface, said label comprising:

an upper label having two ends;

a base label having two ends;

an overlaminate extending over said upper label and beyond each of said upper label ends, said overlaminate having an adhesive underside attached to said base label beyond each end of said upper label, said overlaminate holding said upper label on said base label beyond each end of said upper label;

said upper label having a lower surface portion between its two ends, said lower surface portion disposed over and spaced away from said base label, such that the entirety of the upper label lower surface portion is spaced away from said base label, and said lower surface being moveable into contact with said base label when said multiple layer label is applied to said surface.

17. A multiple layer label as in claim 16, wherein said base label is secured to a liner, said base label separating the entirety of said upper label and said overlaminate from said liner.

18. A multiple layer label as in claim 16, wherein said base label has a layer of adhesive on an underside thereof for holding said label on said curved or non-planar surface.

19. A multiple layer label as in claim 16 wherein said upper label lowermost surface portion is spaced away from said base label when said base label is extended in a flat plane.

20. A multiple layer label as in claim 16 wherein said upper label is removably secured to said base label beyond one end of said upper label.

21. A multiple layer label for application on a curved or non-planar surface, said label comprising:

a base label having an upper surface defined by a periphery;

an upper label having upper label end edges and being disposed on said base label wholly within said periphery;

an overlaminate disposed on said upper label and extending over edges thereof in adhesive contact with said upper surface of said base label;

said upper label having a lower surface portion adjacent to and spaced away from said upper surface of said base label such that the entire lower surface portion of said upper label between said end edges is disposed over and spaced from the upper surface of said base label, said lower surface portion of said upper label being moveable into contact with said base label when said multiple layer label is applied to said surface.

22. A multiple layer label as in claim 21, wherein said base label has a layer of adhesive on an underside thereof for holding said label on said curved or non-planar surface.

23. A multiple layer label as in claim 21 wherein said upper label lower surface portion is spaced away from said base label when said base label is extended in a flat plane.

24. A multiple layer label as in claim 21 wherein said base label is disposed on a surface of a liner and separates said upper label and said overlaminate from any contact with said liner surface.

25. A multiple layer label as in claim 24 wherein said base label has an adhesive on an underside thereof for removable holding said base label on said liner and for holding said label on said curved or non-planar surface.

26. A multiple layer label for application to a curved or non-planar surface comprising:

an overlaminate having ends;

an upper label having ends;

a base label having ends;

said overlaminate ends extending beyond said upper label ends and having an adhesive thereon for engaging said base label and holding said upper label on said base label;

said upper label having a lower surface portion between its ends defining a space with said base label when said base label is in a flat configuration and said lower surface portion in contact with said base label when said multiple layer label is applied to said curved or non-planar surface, such that said entire lower surface portion is in substantial contact with said base label.

27. A multiple layer label as in claim 26 wherein said entire lower surface portion is in contact with said base label throughout the entire length of said lower surface portion.

28. A multiple layer label as in claim 26 wherein said upper label lies alongside said base label without buckling or wrinkling when said label is applied to said surface.

29. A multiple layer label as in claim 26 wherein said lower surface portion is free of adherence with respect to said base label.

30. A multiple layer label as in claim 29 wherein said space between said entire lower surface portion and said base label is free of label components so said lower surface portion can move into contact with said base label.

31. A multiple layer label for application on a curved or non-planar surface, said label comprising:

a base label;

an upper label;

a liner;

said base label fully interposed between said upper label and said liner;

said upper label contacting said base label and being entirely spaced from said liner;

said upper label having two ends disposed on said base label and a lowermost surface portion between said two ends, the lowermost surface portion being disposed adjacent to said base label spaced away therefrom to define a space therebetween, said lower surface portion being moveable into said space upon application of said multiple layer label to said surface.

32. A multiple layer label as in claim 31, said multiple layer label being removable from said liner when applied to said surface, and wherein said lower surface portion of said upper label is disposed through its length against said base label when multiple layer label is applied to said surface.

33. A multiple layer label as in claim 31 wherein said base label has an adhesive on an underside thereof for removably holding said base label on said liner and for holding said label on said curved or non-planar surface.

34. A multiple layer label as in claim 31 wherein said upper label lower surface is spaced away from said base label when said base label is extended in a flat plane.

35. A multiple layer label for application on a curved or non-planar surface, said label comprising:

a base label;

an upper label having two ends;

an adhesive overlaminate disposed over said upper label and having ends extending beyond the ends of said upper label and holding the upper label on said base label at attachment positions on said base label, the length of said overlaminate between said attachment positions being greater than the length of said base label between said attachment positions when said base label is extended in a flat plane, said upper label having a lower surface portion between said ends of said upper label, adjacent said base label and defining with said base label a space therebetween, said lower surface moveable into said space and into contact with said base label when said multiple layer label is applied to said surface.

36. A multiple layer label as in claim 35 wherein said upper label is comprised of multiple layers and said lower surface portion is defined on the layer closest to said base label.

37. A multiple layer label as in claim 36 wherein said lower surface portion is spaced away from said base label when said multiple layer label is flat.

38. A multiple layer label as in claim 37 wherein said lower surface portion contacts said base label throughout its length when said multiple layer label is applied to said curved or non-planar surface.

39. A multiple layer label for application on a curved or non-planar surface, said label comprising:

a base label having two respective ends spaced apart a first distance;

an upper label having a length defined between two ends, said ends of said upper label spaced apart a second distance shorter than said first distance;

said upper label disposed on said base label with both ends of said upper label disposed over said base label and within the ends of said base label;

said upper label having a lowermost surface adjacent said base label, between ends of said upper label, spaced away from said base label and disposed over said base label;

said base label being disposed on a liner and separating the entire length of said upper label from said liner, said lowermost surface defining with said base label a gap therebetween and said surface moveable through said gap into contact with said base label when said multiple layer label is applied to said surface.

40. A multiple layer label as in claim 39 wherein said base label has an adhesive on an underside thereof for removably holding said base label on said liner and for holding said label on said curved or non-planar surface.

41. A multiple layer label as in claim 39 wherein said upper label lower surface is spaced away from said base label when said base label is extended in a flat plane.

42. A multiple layer label for application on a curved or non-planar surface, said label comprising:

a liner;

a base label disposed on said liner;

an upper label;

an overlaminate securing said upper label to said base label;

said upper label having ends and a lower surface portion between said ends adjacent to and spaced away from said base label such that the entire lower surface portion between said ends is spaced from said base label;

said base label separating said upper label lower surface portion and said laminate from all contact with said liner proximate said base label, said lower surface portion between said ends moveable toward and into contact with said base label when said multiple layer label is applied to said surface.

43. A multiple layer label as in claim 42 wherein said base label has an adhesive on an underside thereof for removable holding said base label on said liner and for holding said label on said curved or non-planar surface.

44. A multiple layer label as in claim 42 wherein said upper label lower surface portion is spaced away from said base label when said base label is extended in a flat plane.

45. A multiple layer label for application on a curved or non-planar surface, said label comprising:

a liner;

a base label on one side said liner;

an upper label having ends;

an overlaminate means over said upper label for holding said upper label on said base label beyond said ends such that an entire lower surface of said upper label adjacent said base label is disposed over and spaced away from said base label, with said base label separating the upper label and the overlaminate means from and contact with said one side of said liner, said entire lower surface portion moveable toward and into contact with said base label when said multiple layer label is applied to said surface.

46. A multiple layer label as in claim 45 wherein said base label has an adhesive on an underside thereof for removable holding said base label on said liner and for holding said label on said curved or non-planar surface.

47. A multiple layer label as in claim 45 wherein said upper label lower surface is spaced away from said base label when said base label is extended in a flat plane.

48. A multiple layer label for application on a curved or non-planar surface, said label comprising:

a base label having a periphery therearound;

at least one upper label;

an overlaminate extending beyond and overlapping said at least one upper label and holding said at least one upper label on said base label;

said overlaminate being attached to said base label in areas where said overlaminate extends beyond said at least one upper label and said overlaminate extending beyond said at least one upper label being confined within said periphery of said base label;

said at least one upper label having a lower surface portion spaced away from said base label prior to application of said multiple layer label to a surface, and said spaced away intermediate portion of said at least one upper label moving toward and into contact with said base label throughout the length of said intermediate portion of said at least one upper label when said multiple layer label is applied to said curved or non-planar surface without buckling or wrinkling.

49. A multiple layer label for application on a curved or non-planar surface, said label comprising:

a base label;

an upper label;

means for holding said upper label in position over said base label;

said upper label having at least a lower surface portion adjacent to and spaced away from said base label prior to application of said multiple layer label to a target;

said means for holding being secured to and confined to adhesive contact only with said base label;

said spaced away lower surface portion and said base label defining a space therebetween free of intervening label components, said lower surface portion in contact with said base label throughout the length of said lower surface portion when said multiple layer label is applied to said curved or non-planar surface.

50. A label of multiple layers for application to a surface having one of a curved and a non-planar shape, said label comprising:

a base label;

an upper label having two ends on opposite sides of a lower surface portion of said upper label;

an overlaminate extending over said upper label and being adhesively attached to said base label;

said upper laminate holding said upper label on said base label with said lower surface portion of said upper label adjacent to and spaced from said base label and defining an unobstructed space between said lower surface portion and said base label;

said upper label lower surface portion being in contact with said base label when said base label is applied to said one curved or non-planar surface with said lower surface portion contacting said base label throughout the length of said lower surface portion.

51. A label of multiple layers for application to a surface having one of a curved and a non-planar shape, said label having a base label and an upper label defining two conditions with respect to each other, said label of multiple layers comprising:

a base label;

an upper label having two ends on opposite sides of a lower surface portion of said upper label;

an overlaminate extending over said upper label and being adhesively attached to said base label;

said upper laminate holding said upper label on said base label with said lower surface portion of said upper label adjacent to and spaced from said base label and defining an unobstructed space between said lower surface portion and said base label in one condition of said base label and said upper label;

said upper label lower surface portion being in contact with said base label when said base label is applied to said one curved or non-planar surface with said lower surface portion contacting said base label throughout the length of said lower surface portion in another condition of said base label and said upper label.

52. A multiple layer label for application on a curved or non-planar surface, said label comprising:

a base label;

an upper label;

means for holding said upper label in position over said base label in two respective positions with respect to each other;

said upper label having a lower surface portion spaced away from said base label prior to application of said multiple layer label to a target;

said means for holding being secured to and confined to adhesive contact only with upper label and said base label, said spaced away lower surface portion and said base label defining a space therebetween free of intervening label components in one of said positions so said lower surface portion is free to move toward and contact said base label throughout the length of said lower surface portion in another of said positions when said multiple layer label is applied to said surface.

53. A multiple layer label for application on a curved or non-planar surface, said label comprising:

a base label having two respective ends spaced apart a first distance;

an upper label having a length defined between two ends, said ends of said upper label spaced apart a second distance shorter than said first distance;

said upper label disposed on said base label with both ends of said upper label disposed over said base label and within the ends of said base label;

said upper label having a lowermost surface adjacent said base label, between ends of said upper label, and spaced away from and disposed over said base label in one position of said upper label with respect to said base label;

said base label being disposed on a liner and separating the entire length of said upper label from said liner, said lowermost surface defining ith said base label a gap therebetween and said surface moveable through said gap and into contact with said base label in a second position of said upper label with respect to said base label when said multiple layer label is applied to said surface.

54. A multiple layer label for application on a curved or non-planar surface, said label comprising:

a base label;

an upper label;

a liner;

said base label fully interposed between said upper label and said liner;

said upper label contacting said base label and being entirely spaced from said liner;

said upper label having two ends disposed on said base label and a lowermost surface portion between said two ends, the lowermost surface portion in one position being disposed adjacent to said base label spaced away therefrom to define a space therebetween, said lower surface portion in a second position being moveable into said space into contact with said base label upon application of said multiple layer label to said surface.

55. A multiple layer label for application on a curved or non-planar surface, said label comprising:

a base label;

an upper label having two ends;

an adhesive overlaminate disposed over said upper label and having ends extending beyond the ends of said upper label and holding the upper label on said base label at attachment positions on said base label, the length the length of said overlaminate between said attachment positions being greater than the length of said base label between said attachment positions when said base label is extended in a flat plane, said upper label having a lower surface portion between said ends of said upper label, adjacent said base label and defining with said base label a space therebetween in one position, said lower surface moveable into said space and into contact with said base label in a second position when said multiple layer label is applied to said surface.

56. A multiple layer label for application on a curved or non-planar surface, said label comprising:

a base label having a periphery therearound;

at least one upper label;

an overlaminate extending beyond and overlapping said at least one upper label and holding said at least one upper label on said base label in one of two positions;

said overlaminate being attached to said base label in areas where said overlaminate extends beyond said at least one upper label and said overlaminate extending beyond said at least one upper label being confined within said periphery of said base label;

said at least one upper label having a lower surface portion spaced away from said base label in one position prior to application of said multiple layer label to a surface, and said spaced away intermediate portion of said at least one upper label moving toward and into contact with said base label in another position throughout the length of said intermediate portion of said at least one upper label when said multiple layer label is applied to said curved or non-planar surface without buckling or wrinkling.

57. In combination, a multiple layer label and a curved or non-planar surface, said label comprising:

a base label having a periphery therearound;

an upper label;

an overlaminate extending beyond and overlapping said upper label and holding said upper label on said base label;

said overlaminate being attached to said base label in areas of attachment where said overlaminate extends beyond said upper label and said overlaminate extending beyond said upper label being confined within said periphery of said base label;

said upper label having a lowermost surface adjacent said base label with a respective portion thereof between said areas of attachment spaced away from said base label prior to application of said multiple layer label to a curved or non-planar surface and defining a gap between said portion and said base label, and wherein said multiple layer label is applied to said curved or non-planar surface with said spaced away portion of said upper label in contact with said base label throughout the length of said spaced away portion.

58. In combination, a multiple layer label and a surface having a curved or non-planar shape, said label comprising:

a base label;

an upper label;

means for holding said upper label in position over said base label;

said upper label having a lower surface portion spaced away from said base label prior to application of said multiple layer label to a target;

said means for holding being secured to and confined to adhesive contact only with upper label and said base label, said spaced away lower surface portion and said base label defining a space therebetween free of intervening label components, wherein said multiple layer label is applied to said surface and said lower surface portion is freely movable and contactable with said base label through the length of said lower surface portion so said lower surface portion is free to move toward said base label throughout the length of said lower surface portion when said multiple layer label is applied to said surface.

* * * * *